Dec. 17, 1929.  N. A. CHRISTENSEN  1,739,781
BRAKE MECHANISM
Filed May 24, 1924    2 Sheets-Sheet 2

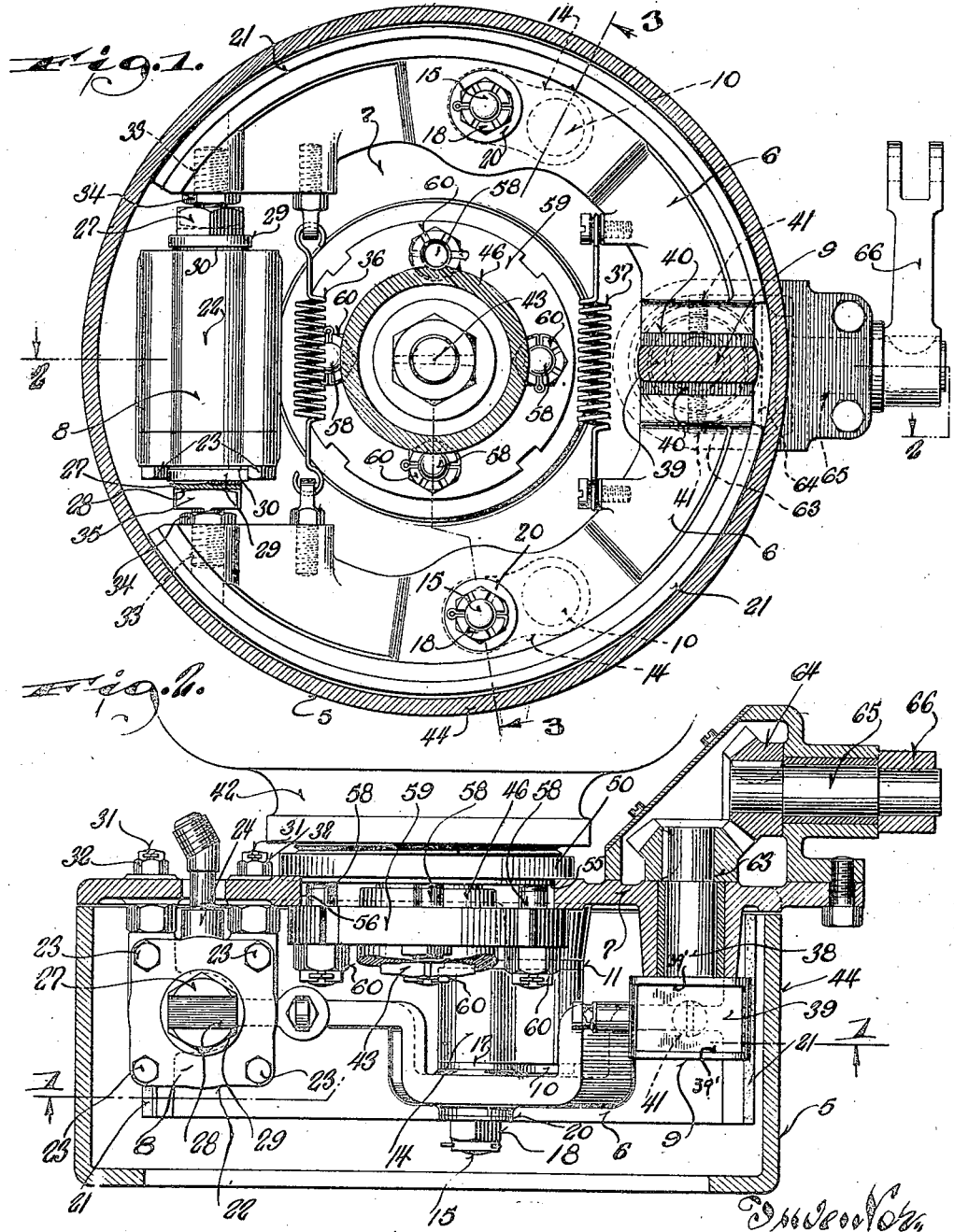

Inventor
Niels A. Christensen

Patented Dec. 17, 1929

1,739,781

UNITED STATES PATENT OFFICE

NIELS A. CHRISTENSEN, OF MILWAUKEE, WISCONSIN

BRAKE MECHANISM

Application filed May 24, 1924. Serial No. 715,752.

The invention relates to brake mechanism for automotive vehicles and trailers for such vehicles, and while more particularly associated, as herein shown, with the transmission shaft of an automobile it may be applied and used in connection with either the front or rear wheels of an automotive vehicle.

One object of the invention is to provide a brake mechanism of the internal expanding type, and more particularly with the shoe form of brake, which shoes may be operated either by fluid pressure or manually, or both, to engage the brake-drum with which they are associated. When the device is used in connection with the front wheel is will be understood that the manually-operated part of the construction can be operated by any of the well-known means now used for operating front wheel mechanical brakes.

A further object of the invention is to provide a transmission brake of suitable proportions and compactly arranged for direct attachment or association with the rear axle housing, and more particularly the gear case of such housing.

The invention further consists in the several features hereinafter set forth and more particularly defined by claims at the conclusion hereof.

In the drawings: Fig. 1 is a sectional view of brake mechanism embodying the invention taken on the line 1—1 of Fig. 2;

Fig. 2 is a sectional view of the device taken on the line 2—2 of Fig. 1;

Figure 3:
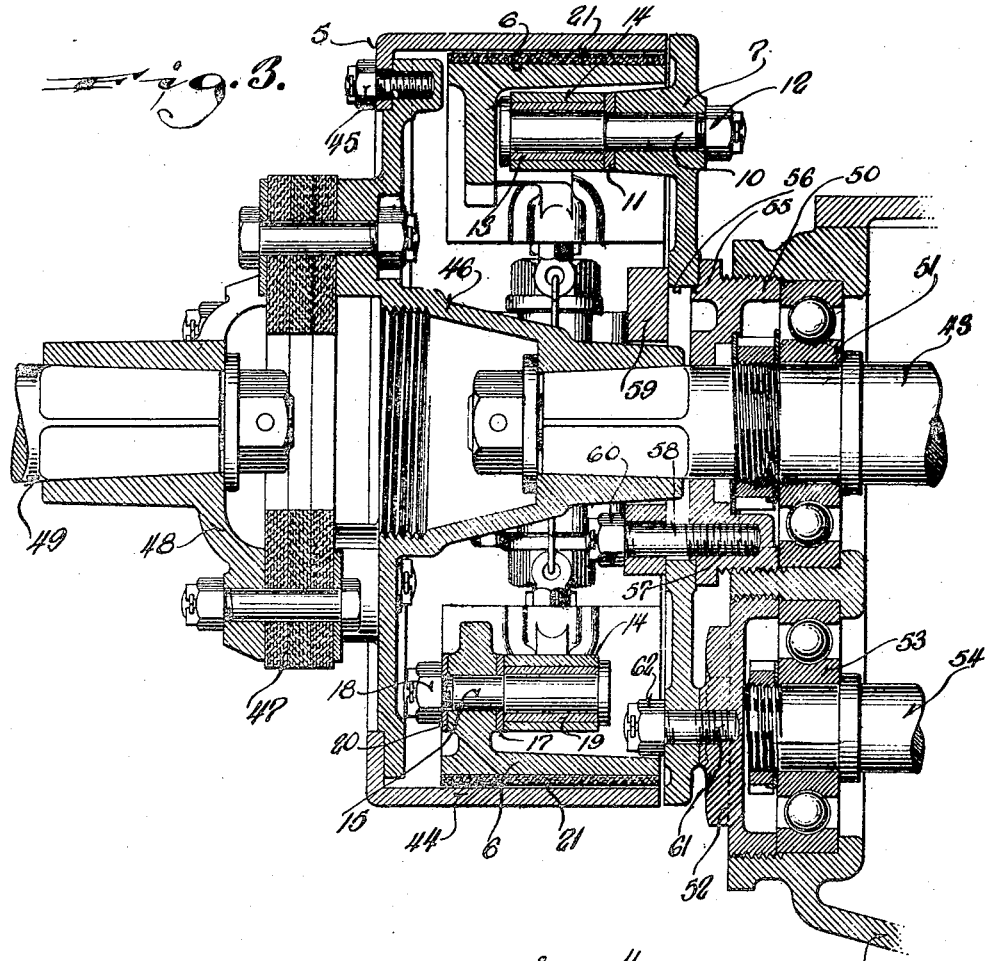
Fig. 3 is a composite sectional view taken on the broken line 3—3 of Fig. 1.
Figure 4:
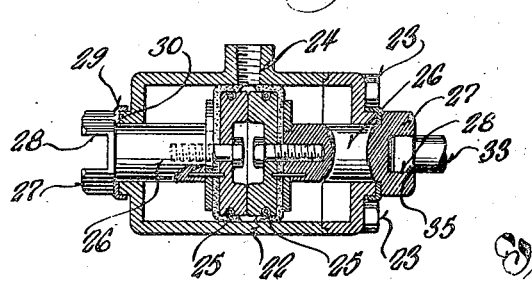
Fig. 4 is a vertical sectional view through the brake cylinder.

In the drawings the numeral 5 designates generally a brake-drum, 6 the brake-shoes for engaging said drum, 7 the support for said shoes, 8 a fluid-pressure motor operatively connected to one of the ends of said shoes to move them into braking engagement with the drum, and 9 a spreader member also connected with the shoes to move them into braking engagement with the drum.

As a means for mounting the shoes 6 on the support 7, I show an anchor bolt or stud 10 clamped to the support 7 by providing a shoulder portion on said bolt engaging a washer 11 adjacent the support and a nut 12. A bushing 13 is interposed between the headed end of the stud 10 and the washer 11 which acts as a bearing for the anchor link 14 and also as a spacer. The anchor link 14 is pivoted at its other end upon a stud 15 carried in the web portion of each brake-shoe. The manner of mounting this stud and its association with the link is the same as that used in connection with the stud 10 and includes a washer 17, a nut 18 and a bushing 19. Where the brake-shoes are made of aluminum or certain other kinds of relatively soft material a washer 20 is interposed between the shoe and the nut 18. Each of the shoes is provided with a brake lining 21 of suitable material.

The connection between the shoes and the support 7 by the links 14 is made at the intermediate or central portion of the shoe and this hanging of the brake-shoes from their medial portions to the support 7 permits them to readily position themselves in a position concentric with the drum and in braking engagement therewith substantially throughout their entire peripheries when braking pressure is applied to their ends.

The fluid-pressure-operated motor 8 which applies pressure to one of the ends of the brake shoes preferably consists of a two-part brake cylinder 22 whose parts are secured together by bolts 23. This cylinder has a central air port 24 for the inlet and exhaust of compressed air, and a pair of opposed suitably packed pistons 25 work therein. Each of the pistons has its rod 26 bolted or otherwise suitably secured to its head. Each rod 26 projects from one end of the cylinder and is provided with a polygonal head 27 exterior of the cylinder and provided with a slot 28. The head of each rod is preferably larger in diameter than the main portion thereof and has a flanged washer 29 abutting against it, the upper one of these washers serving as a watershed, and said piston is limited in its inward movement by engagement of the inner end of said head or washer with a shoulder 30 formed by the end of the cylinder.

The brake-cylinder is secured by suitable studs 31 and nuts 32 to the support 7 which is in the form of a plate to which the brake-cylinder is clamped by said studs. The piston rods are directly and adjustably connected with the ends of the brake-shoes adjacent thereto. This connection in each instance comprises an adjustable jack-screw 33 having threaded connection or mounted in the end portion of the shoe 6 and held in adjusted position by a locknut 34.

Each jack-screw has a flattened head to form a T-shaped member or tongue 35 fitting in the slot 28 of the adjacent piston rod. As the heads 27 of the piston rods are hexagonal they may each be turned by a wrench so that the jack-screw engaged thereby may be turned to the proper position to provide the desired clearance between the shoe and the drum when in a release position, this adjustment also providing for the proper release of the brake-shoes when the manually-operated expander 9 is in its inoperative position. When compressed air is introduced between the pistons they move outwardly and thus move the shoes into braking engagement with the drum.

The shoes are held in a release position and the jack-screws caused to move the pistons inwardly upon the release of pressure by means of springs 36 and 37. The spring 36 is directly connected at its ends to those ends of the shoes that carry the jack-screws 33 while the spring 37 is connected to adjacent ends of the shoes engaging the expander member 9.

The expander member 9 is of a well-known construction in which a shaft 38 has a flattened intermediate portion 39 engaged by hardened steel plates 40 secured to the ends of the shoes 6 adjacent said expander, as by screws 41, said flattened portion cooperating with the cylindrical portion of said member to form shoulders 39' against which the shoes abut to prevent their lateral movement. When this expander is turned from its position shown in Fig. 1, in either direction, it will be noted that it has a cam action on the members 6 to move them into braking engagement with the drum. As both the fluid-pressure-operated motor and the manually-operated expander 9 will move the brake-shoes 6 into engagement with the drum, the one acting as a fulcrum point for the other under separate operation, they will, under conjoint operation, bodily move the brake-shoes 6 into engagement with the drum.

From the foregoing description it will be noted that the brake mechanism above described may be used in connection with the front or rear wheel of an automotive vehicle, or in connection with the transmission shaft, it being noted that the manually-operable means, such as the expander, while auxiliary and useful independent thereof, is more particularly provided for the purpose of holding the automotive vehicle on a grade if the vehicle is left standing for a considerable length of time as under such conditions with certain air brake systems the air brakes would then be left in release and hence the manually-operable means will hold the brakes in said position under these conditions.

The brake mechanism above described has, however, been designed with particular reference to the compact arrangement for connection with the transmission shaft of the vehicle so that it may be used as a fifth brake associated with the brakes of the four wheels and act as a stabilizer through the two rear wheels for the rear axle construction. This fifth or transmission brake is preferably mounted on the front of the rear axle housing 42 which contains the driving gears for the rear wheel shafts or shaft in such a way that when the brake is applied there is no strain on any universal joints or couplings but the strain comes direct on the pinion shaft of this rear axle construction here designated by the numeral 43.

The brake drum 5 is then preferably formed as a flanged ring 44 secured by bolts 45 to a flanged coupling member 46 fast to the pinion shaft 43 and connected through a suitable flexible joint 47 with a coacting universal coupling 48 on the transmission shaft 49. Upon removal of the bolts 45 the flanged drum 44 may be slipped away from its mounting and thereby leave the working parts of the brake mechanism exposed for inspection or repairs without disturbing any of the other parts of the apparatus.

As previously stated, it is preferable to associate this brake mechanism directly with the gear housing 42 of the rear axle, and to illustrate a form of connection with a certain construction of automotive vehicle of a well-known manufacture, I have shown the support 7 generally in the form of a plate which is connected to the screw-plug retainer 50 for the ball-bearing 51 for the pinion shaft 43, and which is also connected to a replacement retainer cap 52 for the bearings 53 for a jack-shaft 54 used in that construction. The plate 7 is annular in form and is centered on the retainer 50 by providing an annular shoulder 55 on the retainer to fit the inner side 56 of the plate 7, and said retainer is further provided with tapped openings 57 to take studs 58 upon which the clamping plate 59 is mounted and retained in engagement with the plate 7 by nuts 60 whereby the plate or support 7 is clamped between the plate 59 and the retainer 50. To prevent any tendency for rotational movement of said plate a stud 61 secured in the head end of the retainer 52 passes through an opening in the plate 7 and a nut 62 on said stud clamps the plate against the head of the retainer 52 at a point off center from the plate's connection with the retainer 50. In this way the plate or support 7 which carries the mounting for the brake-shoes is fixedly secured to the rear axle housing, while the brake-drum is secured to the pinion shaft through the connection of the drum portion 44 with the coupling member 46 which relieves the universal joint connection of the transmission shaft of strains, as the strains due to the braking engagement between the drum and the shoes is transmitted direct to the pinion shaft 43.

Where no jack-shaft is used in the axle housing the angular movement may be prevented by welding or otherwise suitably connecting the stud 61 with a part of the housing.

Where the construction is embodied as a part of the rear axle housing the expediency of using the retainers above mentioned is obviated by providing bosses for screws for fastening the fixture plate direct to the rear axle housing independent of the ball retainer above described.

As a means for operating the spreader member 39 when the device is used as a transmission brake, I have shown the shaft of said spreader having a bevelled gear 63 keyed thereto meshing with a bevelled gear 64 on a short shaft 65 which carries a lever 66 adapted to be connected by the usual links, levers or other well-known connections to a foot or hand-control for the operator of the vehicle, the gearing connections 63 and 64 being used in order to bring the lever 66 into a line running longitudinally of the vehicle to facilitate the use of brake-operating rods. The gear connection also permits of the positioning of the lever 66 either up or down to clear other operating parts on the under side of the vehicle. Also, if the spreader cam 39 should wear down in its initial position, instead of turning the cam around to the other pair of edges the arm 66 may be reversed so as to be in the opposite position from where it was but without any other mechanical effects, it being immaterial in what direction the cam spreader operates, whether right or left hand, since it applies the brake either way.

It will be further noted that the slot 28 with the jack-screw working therein at one end and the flanges of the spreader cam engaging the other ends of the pair of shoes in addition to the firmly hinged connection between the shoes and the supporting plate prevents said shoes from lateral displacement.

From the foregoing description it will be noted that I have provided a vehicle brake mechanism in which the shoes are operable either by manually-operated means, by fluid-pressure-operated means, or by the conjoint operation of both of said means, and that I have, furthermore, specifically provided a construction in which the brake mechanism is directly associated with the rear axle housing and beyond the universal joint for the transmission shaft in order to relieve said shaft of strains due to braking, and permit the brake to operate directly on the shaft which is connected by the usual gearing with the rear axle or axle shafts of the vehicle.

I desire it to be understood that this invention is not to be limited to any specific form or arrangement of parts except in so far as such limitations are included in the claims or necessitated by the prior art.

What I claim as my invention is:

1. In brake mechanism of the character described, the combination with a rotatable brake-drum, of a pair of brake-shoes mounted within the drum and engageable therewith, fluid-pressure-operated means interposed between adjacent ends of said shoes and operable to swing said shoes into engagement with said drum, a manually-operable cam member interposed between the other ends of said shoes and operable to swing said shoes into engagement with said drum, a support for said shoes, and means to release said shoes from engagement with said drum.

2. In brake mechanism of the character described, the combination with the rear axle housing and the drive shaft journalled therein, the bearing for said shaft and the retainer for said bearing, of a brake-supporting member clamped to said retainer, a brake-shoe hung from said supporting member, fluid-pressure-operated means including a brake cylinder mounted on said supporting member for moving said shoe into engagement with said drum, and means to release said shoe from said drum.

3. In brake mechanism of the character described, the combination with a rotatable brake-drum, of a pair of medially pivotally supported brake-shoes mounted within the drum and engageable therewith, fluid-pressure-operated means engageable with said shoes on one side of their pivotal mounting to move them into engagement with said drum, manually-operated means engageable with said shoes on the other side of their pivotal mounting, a support for said shoes, and means to release said shoes from engagement with said drum.

4. In brake mechanism of the character described, the combination with a rotatable brake-drum, of a supporting member, a pair of brake-shoes disposed within the drum and engageable therewith, anchor links connecting the medial portions of said shoes to said supporting member, a brake cylinder having opposed pistons working therein and piston rods in thrusting association with adjacent ends of said shoes and operable to swing said shoes into engagement with said drum, a manually-operable cam member interposed between the other ends of said shoes and operable to swing said shoes into engagement with said drum, and means to release said shoes from engagement with said drum.

5. In brake mechanism of the character described, the combination with a rotatable brake drum, of a pair of brake members engageable with said drum, a fluid-pressure-operated means interposed between said brake members at one end thereof, a manually operable expander interposed between said brake members at their other end, said fluid-pressure-operated means including oppositely moving thrust members upon which the end portions of said brake members are free to pivot when moved by said expander, a support for said shoes, and means to release said shoes from engagement with said drum.

In testimony whereof, I affix my signature.

NIELS A. CHRISTENSEN.